(12) United States Patent
Misono et al.

(10) Patent No.: US 8,919,870 B2
(45) Date of Patent: Dec. 30, 2014

(54) MOUNTING STRUCTURE OF VEHICULAR SUNROOF VISOR

(71) Applicant: Honda Access Corp., Niiza-shi, Saitama (JP)

(72) Inventors: Yoshimasa Misono, Niiza (JP); Masahiro Abe, Niiza (JP); Hiroshi Takakura, Niiza (JP)

(73) Assignee: Honda Access Corp., Niiza-shi (JP)

( * ) Notice: Subject to any disclaimer, the term of this patent is extended or adjusted under 35 U.S.C. 154(b) by 0 days.

(21) Appl. No.: 13/865,542

(22) Filed: Apr. 18, 2013

(65) Prior Publication Data
US 2013/0278024 A1 Oct. 24, 2013

(30) Foreign Application Priority Data
Apr. 23, 2012 (JP) ................. 2012-098191

(51) Int. Cl.
*B60J 7/22* (2006.01)
(52) U.S. Cl.
CPC ...................... *B60J 7/226* (2013.01)
USPC ................... 296/217; 296/216.07
(58) Field of Classification Search
CPC ...................................... B60J 7/226
USPC ............................. 296/216.07, 217
See application file for complete search history.

(56) References Cited

U.S. PATENT DOCUMENTS

| 4,480,869 A | 11/1984 | Splithoff |
| 4,934,754 A * | 6/1990 | Cioffi ........................... 296/217 |
| 5,639,142 A * | 6/1997 | Willey ........................... 296/217 |
| 7,780,226 B2 * | 8/2010 | Sugimura et al. ......... 296/216.07 |
| 2006/0255629 A1 | 11/2006 | Kinzel |

FOREIGN PATENT DOCUMENTS

| DE | 3432908 | * | 3/1986 |
| DE | 3132713 | * | 5/1988 |
| JP | 62-010173 Y2 | | 3/1987 |
| JP | 06-039206 B2 | | 5/1994 |
| JP | 2580745 Y2 | | 9/1998 |

OTHER PUBLICATIONS

Japanese Office Action dated Dec. 17, 2013, issued in corresponding Japanese Patent Application No. 2012-098191 (2 pages). (Partial English translation).

* cited by examiner

*Primary Examiner* — Dennis H Pedder
(74) *Attorney, Agent, or Firm* — Westerman, Hattori, Daniels & Adrian, LLP

(57) ABSTRACT

Provided is a structure enabling mounting at a lower position and on a forward side of an opening section. A sunroof visor is to be installed in a vehicle including: the opening section formed on a roof portion; and a sunroof capable of freely opening the opening section. The opening section possesses an edge portion extending downward and having a thin-walled structure vertically composed of: corner edge sections as vertically short edges; slanted edge sections; and vertically elongated edge sections. The sunroof visor is to be fixed to the forward side of the opening section through brackets. Each bracket includes: an extended supporting portion extended forward from the opening section and used to fix the sunroof visor; and an engagement portion engageable with one vertically elongated edge section after being moved thereto from one corner edge section or slanted edge section, for coupling the sunroof visor.

6 Claims, 13 Drawing Sheets

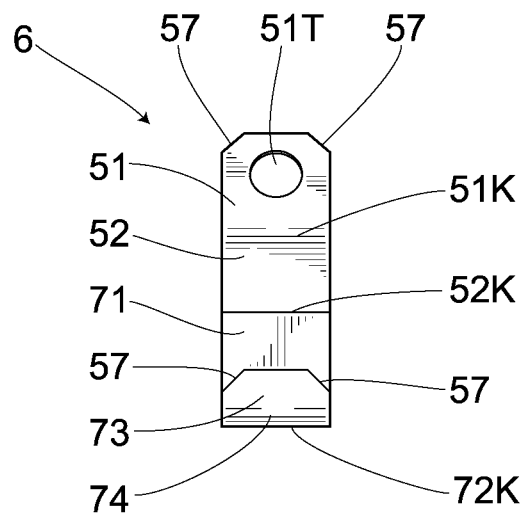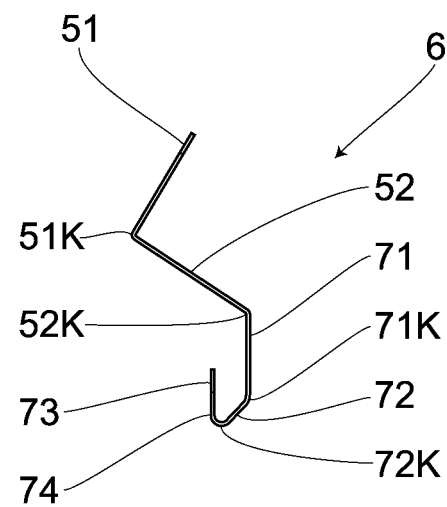
FIG.6A  FIG.6B
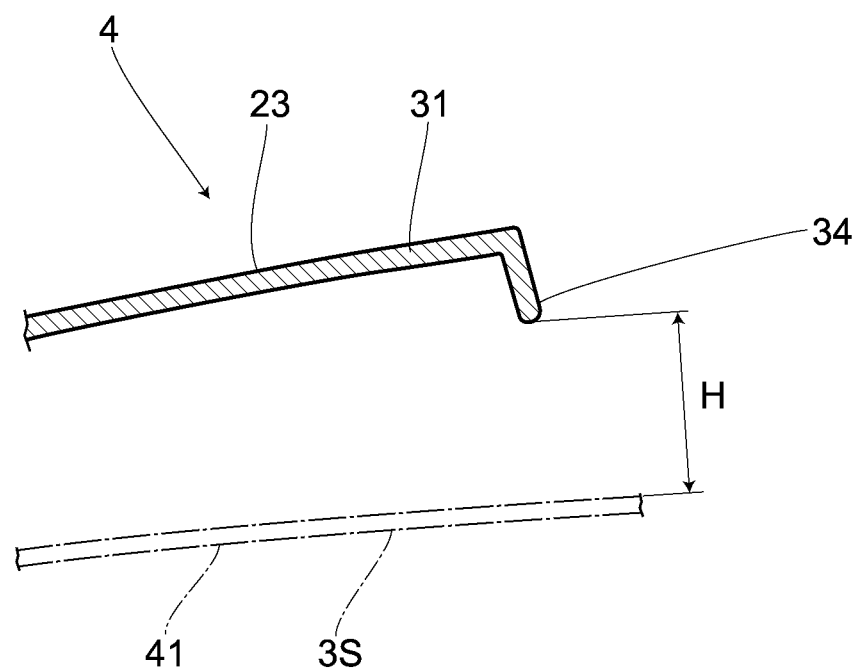
FIG.7

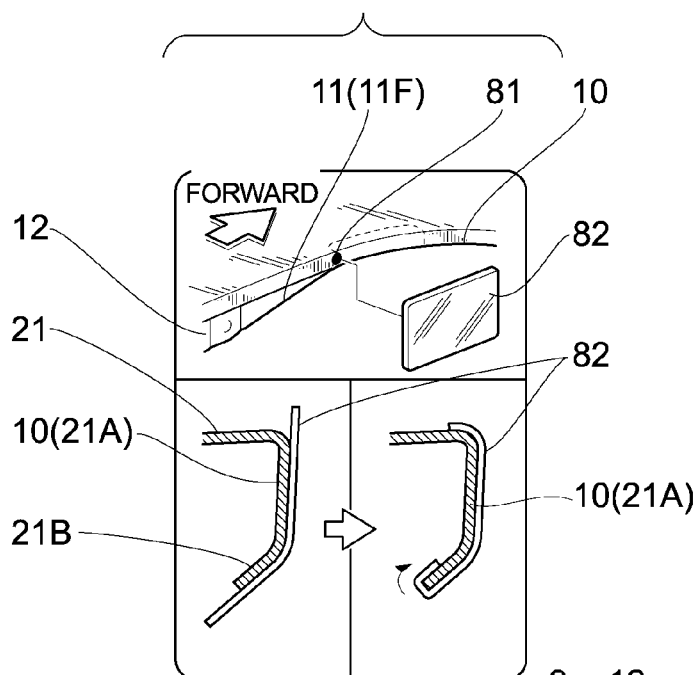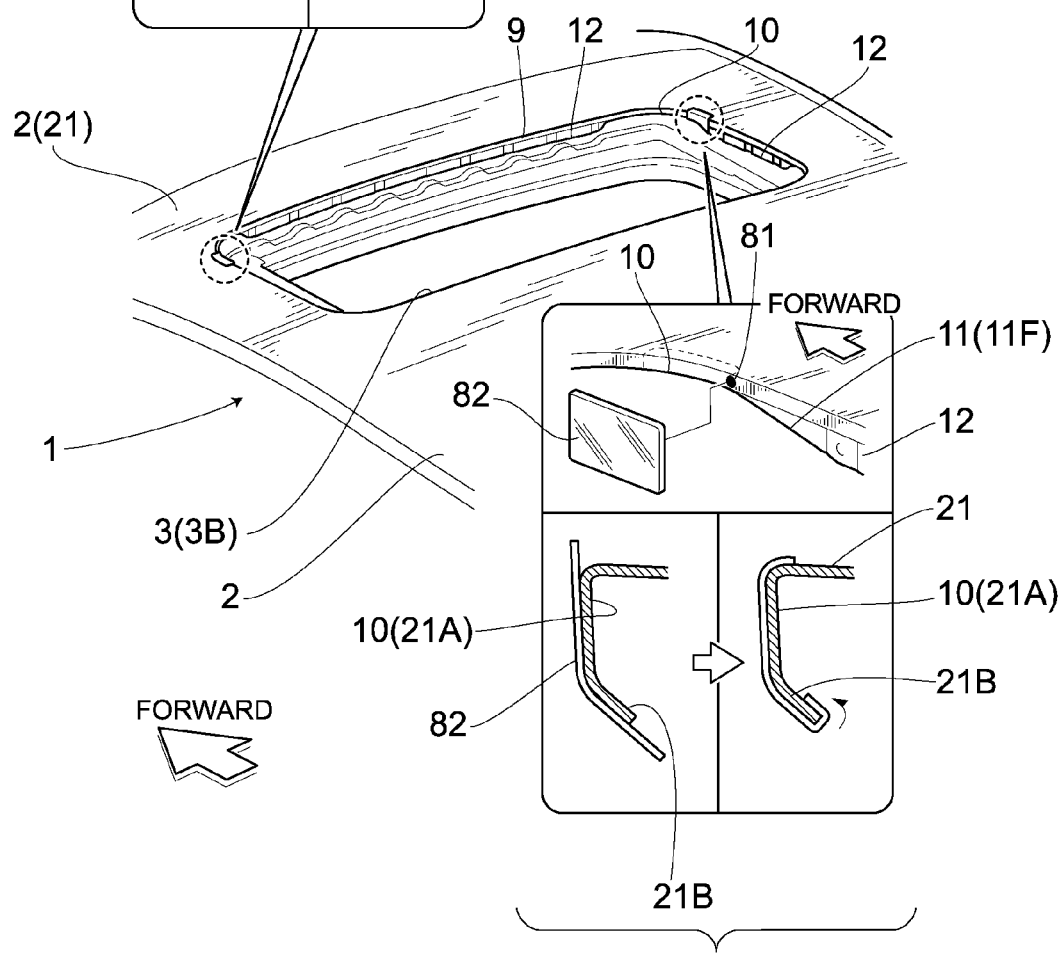

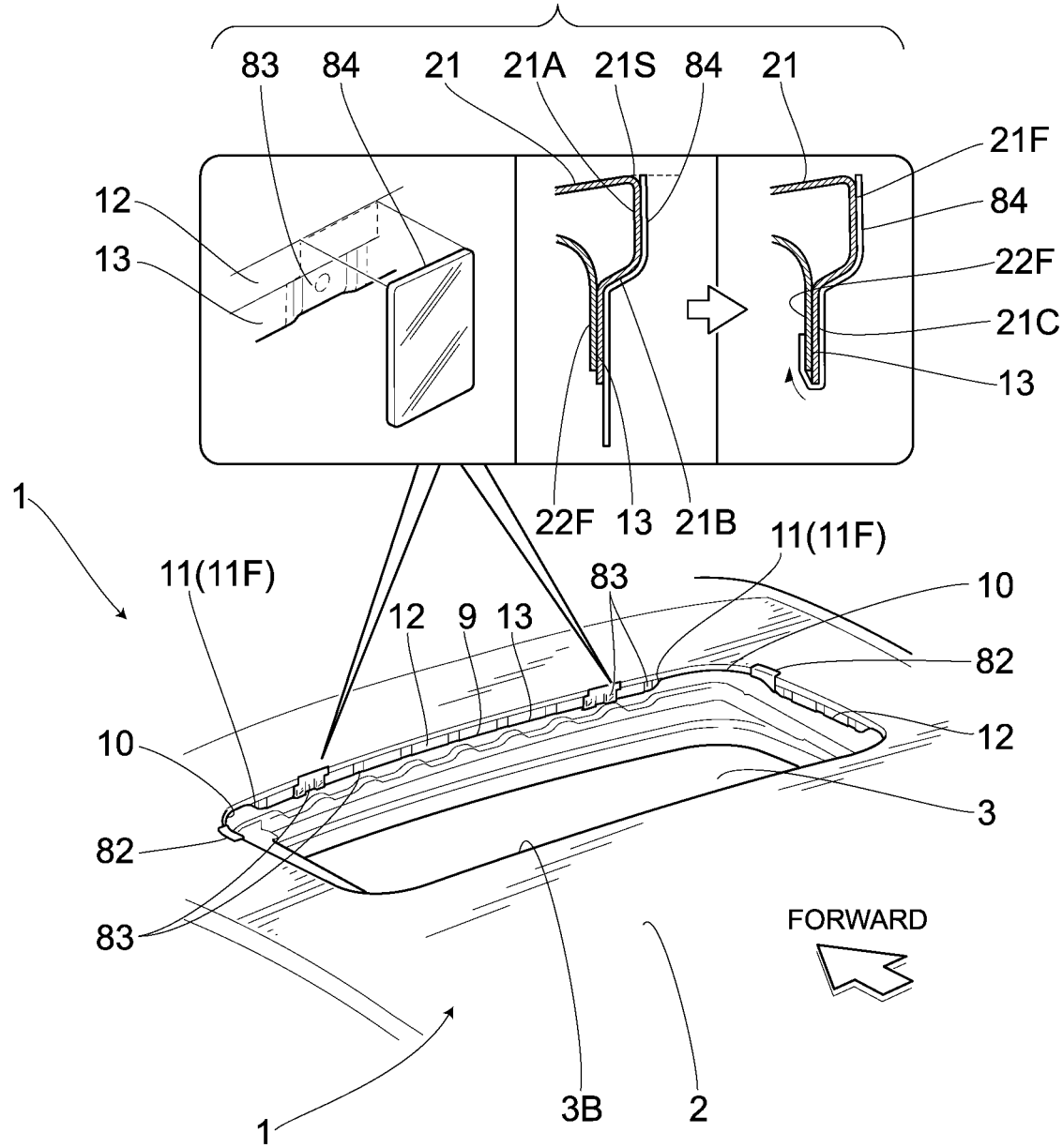

MOUNTING STRUCTURE OF VEHICULAR SUNROOF VISOR

BACKGROUND OF THE INVENTION

1. Field of the Invention

The present invention relates to a mounting structure of a vehicular sunroof visor that is to be installed in a vehicle including: an opening section formed on a roof portion of the vehicle; and a sunroof capable of freely opening the opening section, the vehicular sunroof visor being arranged on a forward side of the opening section.

2. Description of Related Art

Conventionally, as an invention of such kind, there has been known a sunroof visor disclosed in, for example, Japanese Examined Utility Model Application Publication No. Sho 62-10173. According to this utility model, there is employed a type of sunroof where an opening section formed on a vehicle roof can be freely opened and closed by a sliding panel. The sunroof visor of this utility model is a sun visor that covers the opening section and is formed into a shape protruding upward. Particularly, this sun visor can be detachably attached to a vehicle roof side through a mounting structure. More particularly, an upper portion of a hook of the mounting structure is to be attached to a roof surface for mounting the sunroof visor.

Further, a mounting structure of an automotive sun visor is disclosed in, for example, Japanese Examined Patent Application Publication No. Hei 6-39206. According to this mounting structure, oval long holes are formed on a long edge portion and a short edge portion of a visor main body. Further, mounting brackets are to be detachably engaged with portions of a vehicle body that correspond to the long holes. Here, a through hole corresponding to a long hole is bored in each mounting bracket, and a reinforcing board is additionally provided to a mounting bracket that is disposed on the short edge portion. A through hole corresponding to a long hole is also bored in the reinforcing board. Bolts are then inserted from outside a visor main body through the long holes and through holes. Each bolt includes a flat head portion and is provided with a rotation stopping member allowing the bolt to engage with the long hole in an unrotatable manner. Particularly, a nut is then screwed to the bolt from inside the visor main body, thus allowing the visor main body to be mounted on the vehicle body through the mounting brackets. Moreover, there has also been known a roof visor disclosed in Japanese Utility Model No. 2580745. According to this utility model, a hook structure is used to fix a roof visor to a forward end of an opening section. The hook structure is composed of a forward mounting bracket and a side mounting bracket. Here, each one of the forward and side mounting brackets is formed of a metal plate that has been bended into an "L" shape. Particularly, the metal plate is bended substantially at a center portion thereof. Further, each one of the forward and side mounting brackets includes: an abutting portion that is formed on an upper base end thereof and serves to tightly abut against a rear surface of a visor main body; and a claw portion that is formed on a lower end thereof. As for the forward mounting bracket, a female screw pattern is engraved in the abutting portion thereof. Meanwhile, as for the side mounting bracket, a bolt through hole having a shape of a long hole is formed as a cutout in the abutting portion thereof. This bolt through hole allows a bolt to slide in a longitudinal direction thereof, such that positioning becomes possible.

As for the sunroof visor disclosed in Japanese Examined Utility Model Application Publication No. Sho 62-10173, since the upper portion of the hook is to be fixed to the roof surface for mounting the sunroof visor, a height of a mounting position of the hook to the sunroof visor and a height of the hook itself become large, thus causing the hook to be more affected by a load applied thereto by the visor, and the mounting position to be more susceptible to a load resulting from thermal expansions of the visor and the hook.

In comparison, the automotive sun visor disclosed in Japanese Examined Patent Application Publication No. Hei 6-39206, is mounted through a structure where a forward mounting bracket is to be attached to a lower position of a roof visor.

However, as for a mounting structure of a sunroof visor of such type, it is desired that there be employed a structure where a sunroof visor having a low and sporty shape can be attached to a bracket(s) on a forward side of an opening section, from the perspectives of ensuring a rigidity of the mounting structure, and improving an exterior appearance and an aerodynamic performance. As compared to the automotive sun visor disclosed in Japanese Examined Patent Application Publication No. Hei 6-39206, the roof visor disclosed in Japanese Utility Model No. 2580745 is mounted through the structure where the roof visor is attached to the mounting brackets on a forward side of the opening section.

According to a structure shown in FIG. 2 of Japanese Utility Model No. 2580745, an upper portion of the forward mounting bracket is bended into a substantial "L" shape, thereby allowing a mounting position of the forward mounting bracket to the roof visor to be arranged forward. However, since this is a structure where a grip portion formed on a lower end of the bracket is to be engaged with a flange of the opening section from underneath, the portion that has been bended into the "L" shape may come into contact with the flange when engaging the grip portion with a lower end of the flange by vertically lifting the forward mounting bracket. Thus, there exists a concern that mounting may not be carried out smoothly. Further, according to a structure shown in FIG. 3 of Japanese Utility Model No. 2580745, a vertical portion of the side mounting bracket abuts against the flange. Particularly, with regard to such vertical portion, a height of a portion thereof above the opening section is formed larger than that of the grip portion. For this reason, although the portion that has been bended into the "L" shape may not be a hindrance when engaging the grip portion with the flange, there still exists a problem where the roof visor needs to be mounted on such mounting bracket at a high position. This is because a height of this mounting bracket is larger by an extended length of the vertical portion.

SUMMARY OF THE INVENTION

The present invention has been made to solve the aforementioned problems. In fact, it is an object of the present invention to provide a mounting structure capable of lowering a mounting position of a sunroof visor and enabling the mounting of the sunroof visor on a forward side of an opening section.

The aforementioned object is achieved by the invention of a first aspect of the present invention. The invention of the first aspect is a mounting structure of vehicular sunroof visor, for use in a vehicle that has: an opening section formed on a roof portion; and a sunroof capable of freely opening and closing the opening section. The mounting structure includes: a vehicular sunroof visor disposed on a forward side of the opening section; an edge portion provided in the opening section; and at least one bracket for fixing the vehicular sunroof visor to the opening section. Here, the edge portion extends downward and is composed of at least one vertically short edge section and at least one vertically elongated edge section. Further, each bracket has: an extended supporting portion that is extended forward from the opening section and is used to fix the vehicular sunroof visor; and an engagement portion engageable with the at least one vertically elongated edge section after being moved thereto from the at least one vertically short edge section, such vertically elongated edge section serving as a location for coupling the vehicular sunroof visor.

According to the invention of a second aspect, the at least one vertically elongated edge section for engaging the engagement portion includes a lower edge that is formed forward and away from an inner surface of the opening section, and the at least one bracket further includes: a fitting portion that is formed below the extended supporting portion and substantially conforms with the inner surface of the opening section; and a lower extended portion that is formed between the fitting portion and the engagement portion.

According to the inventions of a third and fourth aspects, at least one slanted edge section is provided between the at least one vertically short edge section and the at least one vertically elongated edge section, such slanted edge section slanting downward from the at least one vertically short edge section to the at least one vertically elongated edge section.

According to the inventions of a fifth and sixth aspects, at least one fixing location for fixing the extended supporting portion to the vehicular sunroof visor is set away from the opening section in a forward direction.

According to the inventions of a seventh and eighth aspects, the at least one fixing location corresponds to a bracket through hole bored in the extended supporting portion, and at least one visor through hole corresponding to the bracket through hole is bored in the vehicular sunroof visor, such extended supporting portion being fixed to the vehicular sunroof visor through a fixation unit that is inserted through the bracket through hole and the at least one visor through hole.

According to the inventions of a ninth and tenth aspects, the extended supporting portion includes a visor attachment portion that is formed on an upper section thereof and conforms with an inner surface of the vehicular sunroof visor, such visor attachment portion having the bracket through hole bored therein.

According to the inventions of an eleventh and twelfth aspects, an elastic molding is sandwiched between an upper surface of the roof portion and the vehicular sunroof visor in a pressurized manner.

According to the inventions of a thirteenth and fourteenth aspects, the engagement portion includes: a vertical lower portion provided on a lower end of the lower extended portion; a bended portion formed by curving a lower end of the lower portion outward and upward; and a folded-back portion slanting outward and upward from the bended portion, such folded-back portion having a chamfered section formed on upper left and right corners thereof.

According to the mounting structure of vehicular sunroof visor described in the first aspect of the present invention, the brackets used for mounting the vehicular sunroof visor can engage with the opening section of the vehicle at a lower position, thereby making it possible to lower a mounting position of the vehicular sunroof visor itself, thus not only improving an exterior appearance, but also reducing an air resistance such that a mounting rigidity can be improved as well.

According to the mounting structure of vehicular sunroof visor described in the second aspect of the present invention, each bracket includes, for example, the extended supporting portion, the fitting portion and the lower extended portion that are substantially formed into a toppled "U" shape as a whole. Here, the brackets are to be arranged along the opening section, thereby improving a degree of freedom for adjusting the mounting position of the vehicular sunroof visor in a forward-rearward direction.

According to the mounting structures of vehicular sunroof visor described in the third and fourth aspects of the present invention, the engagement portion can smoothly engage with one of the vertically elongated edge sections when guided by one of the slanted edge sections.

According to the mounting structures of vehicular sunroof visor described in the fifth and sixth aspects of the present invention, the vehicular sunroof visor can be mounted on the forward side of the opening section.

According to the mounting structures of vehicular sunroof visor described in the seventh and eighth aspects of the present invention, the extended supporting portion can be easily fixed to the vehicular sunroof visor through the fixation unit that is to be inserted through the bracket through hole and one of the visor through holes.

According to the mounting structures of vehicular sunroof visor described in the ninth and tenth aspects of the present invention, the visor attachment portion conforming with the inner surface of the vehicular sunroof visor can be easily fixed thereto through the fixation unit that is to be inserted through the bracket through hole and each visor through hole.

According to the mounting structures of vehicular sunroof visor described in the eleventh and twelfth aspects of the present invention, an elastic restoring force of the molding causes upper portions of the brackets to be subjected to an upward force (an upward force applied diagonally) that is generated on the forward side of the opening section. Thus, not only the engagement portion of each bracket can further reliably engage with the edge portion, but the brackets can tightly abut against an opening flange portion(s).

According to the mounting structures of vehicular sunroof visor described in the thirteenth and fourteenth aspects of the present invention, corners of each bracket shall not come into contact with the opening section when moving the corresponding bracket in the horizontal direction.

BRIEF DESCRIPTION OF THE DRAWINGS

FIG. 6A is a rear view of a bracket that is to be disposed in a left-right direction in the aforementioned mounting structure.

FIG. 6B is a side view of the bracket that is to be disposed in the aforementioned left-right direction.

FIG. 7 is a cross-sectional view of a rearward portion of a sunroof visor of the aforementioned mounting structure.

FIGS. 10, 10A and 10B are an explanatory view showing a step of attaching a protection sheet to a side section of an edge portion in the first embodiment.

FIGS. 11 and 11A are an explanatory view showing a step of attaching the protection sheet to a forward section of the edge portion in the first embodiment.

FIGS. 12 and 12A are an explanatory view showing a step of mounting lateral brackets on corner edge sections in the first embodiment.

FIGS. 13 and 13A are an explanatory view showing a step of mounting forward brackets on the vertically elongated edge section in the first embodiment.

FIGS. 14 and 14A are an explanatory view showing a step of mounting the forward portion of the sunroof visor in the first embodiment.

FIGS. 15 and 15A are an explanatory view showing a step of mounting the lateral portion of the sunroof visor in the first embodiment.

FIGS. 16, 16A, 16B and 16C are an explanatory view of a mounted state of the first embodiment.

DETAILED DESCRIPTION OF THE INVENTION

With reference to the accompanying drawings, described hereunder is an embodiment of a mounting stricture of a vehicular sunroof visor of the present invention.
(First Embodiment)

Figure 1:
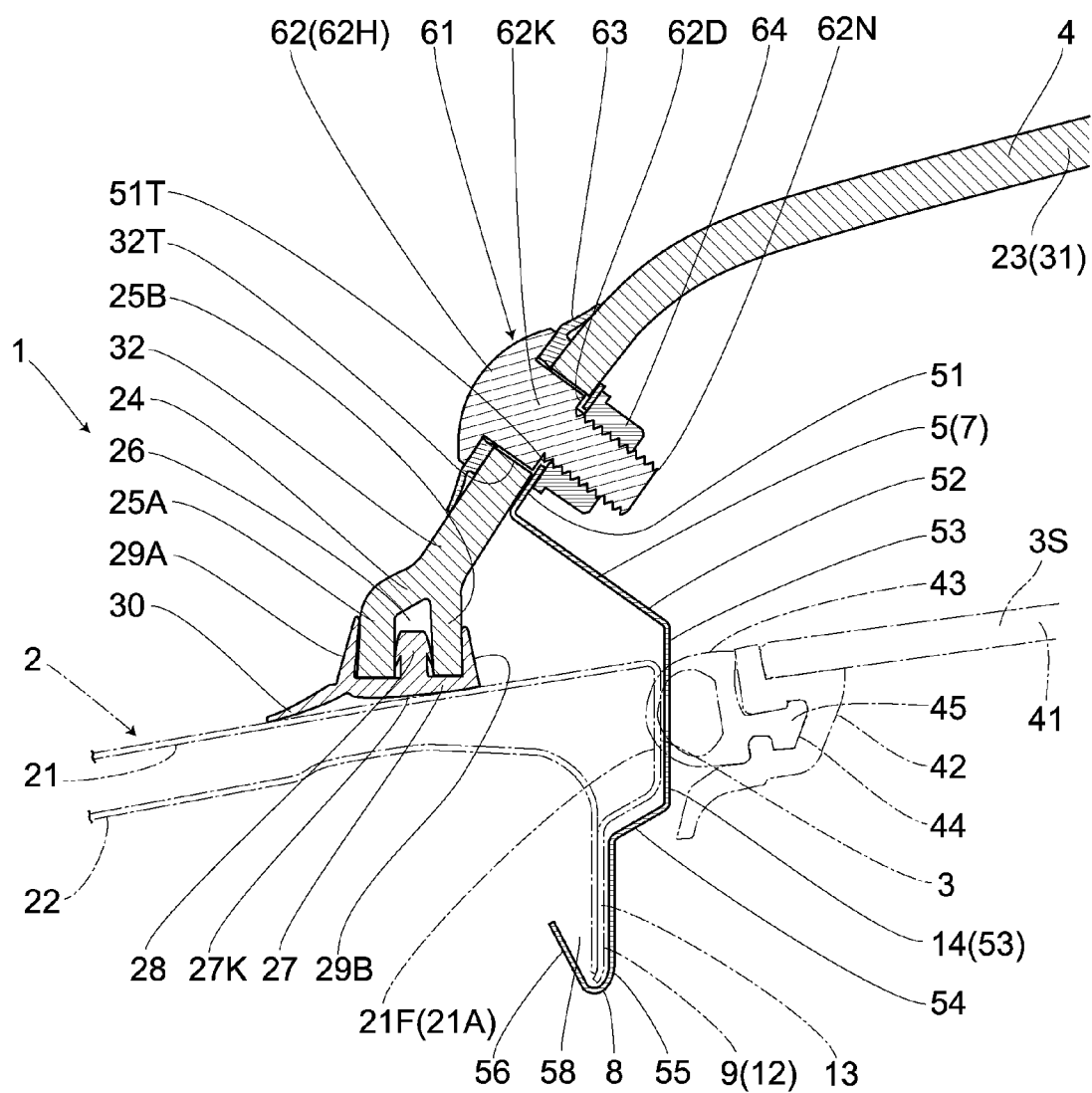
FIG. 1 is a cross-sectional view showing a mounting structure of a first embodiment of the present invention.
Figure 17:
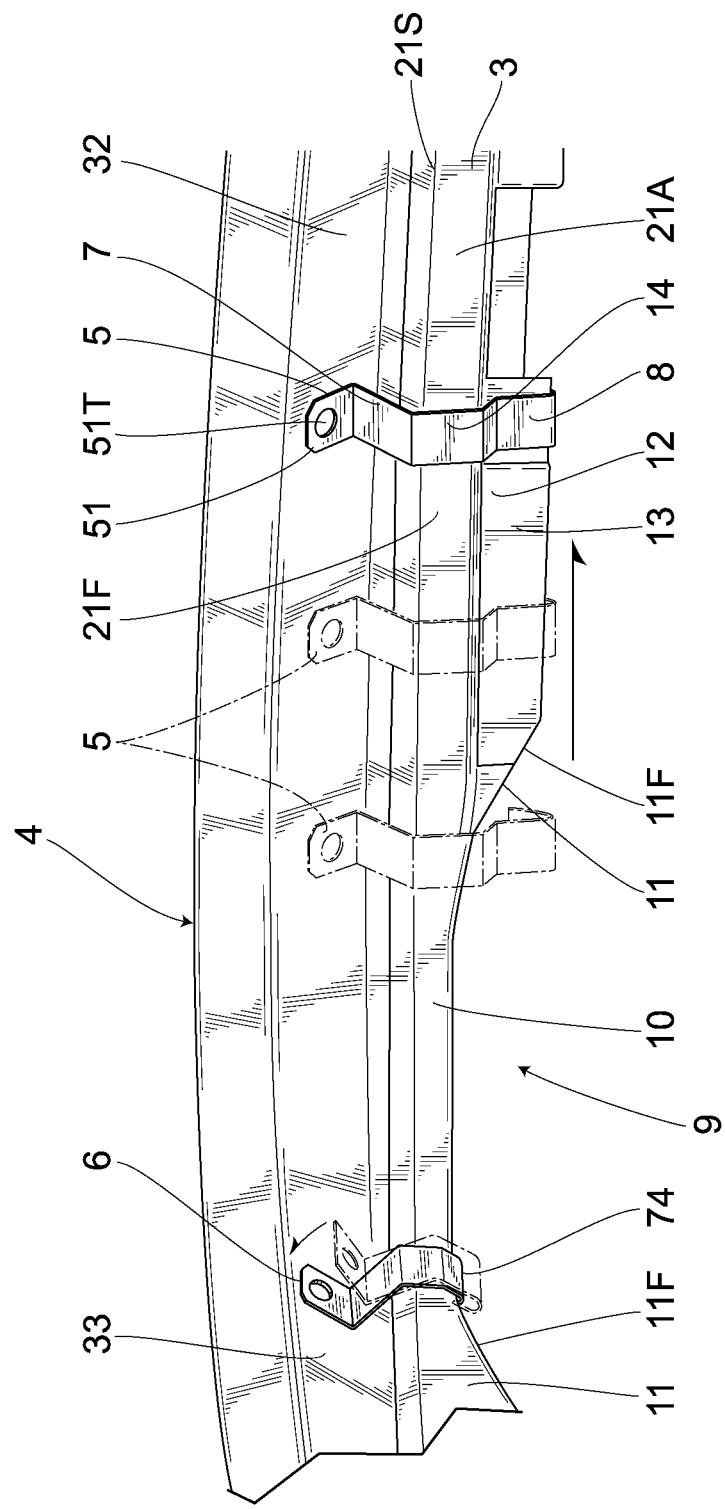
FIG. 17 is a perspective view explaining a mounting method of the first embodiment.

A first embodiment of the present invention is shown in FIG. 1 thorough FIG. 17. An opening section 3 is formed on a roof portion 2 of a vehicle 1. Further, there are provided: a sunroof 3S capable of freely opening and closing the opening section 3; and a vehicular sunroof visor 4 disposed on a forward side of the opening section 3. Here, the sunroof visor 4 is so fixed that it covers the forward side of the opening section 3 through brackets 5, 6 that are arranged in a forward and a left-right directions. Each bracket 5 includes: an extended supporting portion 7 that is extended in the forward direction along an upper surface of the opening section 3 and is used to fix the sunroof visor 4; and an engagement portion 8 that is to be engaged with the opening section 3. The opening section 3 is provided with an edge portion 9 extending downward from an upper surface of the roof portion 2. Particularly, the edge portion 9 is formed into a thin-walled structure allowing the engagement portion 8 to engage therewith. More particularly, the edge portion 9 includes: corner edge sections 10 serving as vertically short edge sections; slanted edge sections 11; and vertically elongated edge sections 12, the corner edge, slanted edge and vertically elongated edge sections 10, 11 and 12 being arranged in a vertical direction. Here, the engagement portion 8 is to be inserted from either one of the corner edge sections 10 or one of the slanted edge sections 11, followed by moving such engagement portion 8 to one of the vertically elongated edge sections 12 that serve as locations for coupling the sunroof visor 4, thus allowing the extended supporting portion 7 to be fixed to the sunroof visor 4. Each bracket 5 or bracket 6 is formed by bending a metal plate having a substantially constant width in a left-right direction.

Figure 3:
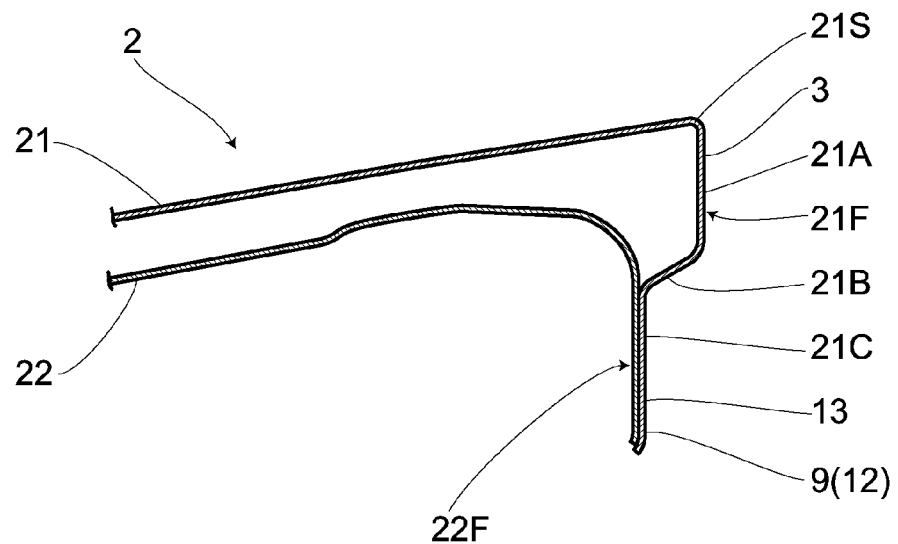
FIG. 3 is a cross-sectional view showing a vertically elongated edge section of the aforementioned mounting structure.

As shown in FIG. 3, for example, a lower edge 13 extending below the opening section 3 is located forward and away from the opening section 3. Further, as shown in FIG. 1, for example, an intermediate portion 14 of the bracket 5 is substantially formed into a toppled "U" shape that conforms with a shape of the opening section 3.

Figure 2:
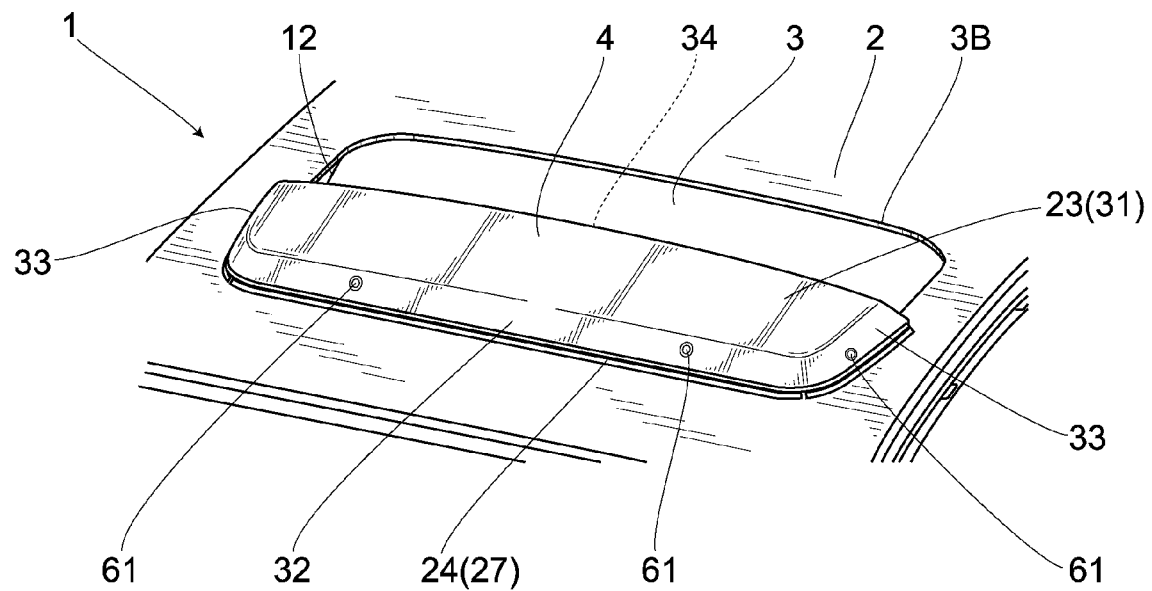
FIG. 2 is a perspective view showing the aforementioned mounting structure.

As shown in FIG. 2, the opening section 3 provided on a forward side of the roof portion 2, extends in a vehicle width direction. The sunroof 3S moves forward from or rearward to a rear edge portion 3B of the opening section 3 such that the corresponding opening section 3 can be covered thereby.

The roof portion 2 includes: a roof panel 21 composing a surface of the roof portion 2; and a panel-shaped stiffener 22 that serves as a stiffening member and is attached to a back surface of the roof panel 21.

One of the vertically elongated edge sections 12 is formed on a forward side of the edge portion 9 of the opening section 3, and is located in a central region thereof in the vehicle width direction. As shown in FIG. 3, this vertically elongated edge section 12 is formed by joining an opening flange portion 21F of the roof panel 21 and an opening flange portion 22F of the stiffener 22 to each other. Further, other vertically elongated edge sections 12 are also formed on a left and right sides of the edge portion 9 of the opening section 3.

As shown in FIG. 3, the opening flange portion 21F includes: an upper section 21A extending downward; a slanted section 21B extending obliquely downward from a lower end of the upper section 21A; and a lower section 21C extending downward from a lower end of the slanted section 21B. Here, each one of: a boundary 21S between an upper surface of the roof panel 21 and the upper section 21A; a boundary between the upper section 21A and the slanted section 21B; and a boundary between the slanted section 21B and the lower section 21C, is configured as a bended section.

Further, the opening flange portion 22F extends downward in a manner such that it conforms with the aforementioned lower section 21C. Particularly, the opening flange portion 22F and the lower section 21C are to be joined together through spot welding, with the two being placed over each other. Here, the slanted section 21B is so slanted that the lower end thereof points to the forward side of the opening section 3 (a left side in FIG. 3), and that an angle thereof to the horizontal is not larger than 45 degrees.

In the present embodiment, the aforementioned lower edge 13 is composed of the lower section 21C and the opening flange portion 22F joined thereto. Further, the lower edge 13 is provided forward with respect to the upper section 21A that composes an inner surface of the opening section 3, and is actually located away therefrom by a distance determined by the slanted section 21B.

Figure 12:
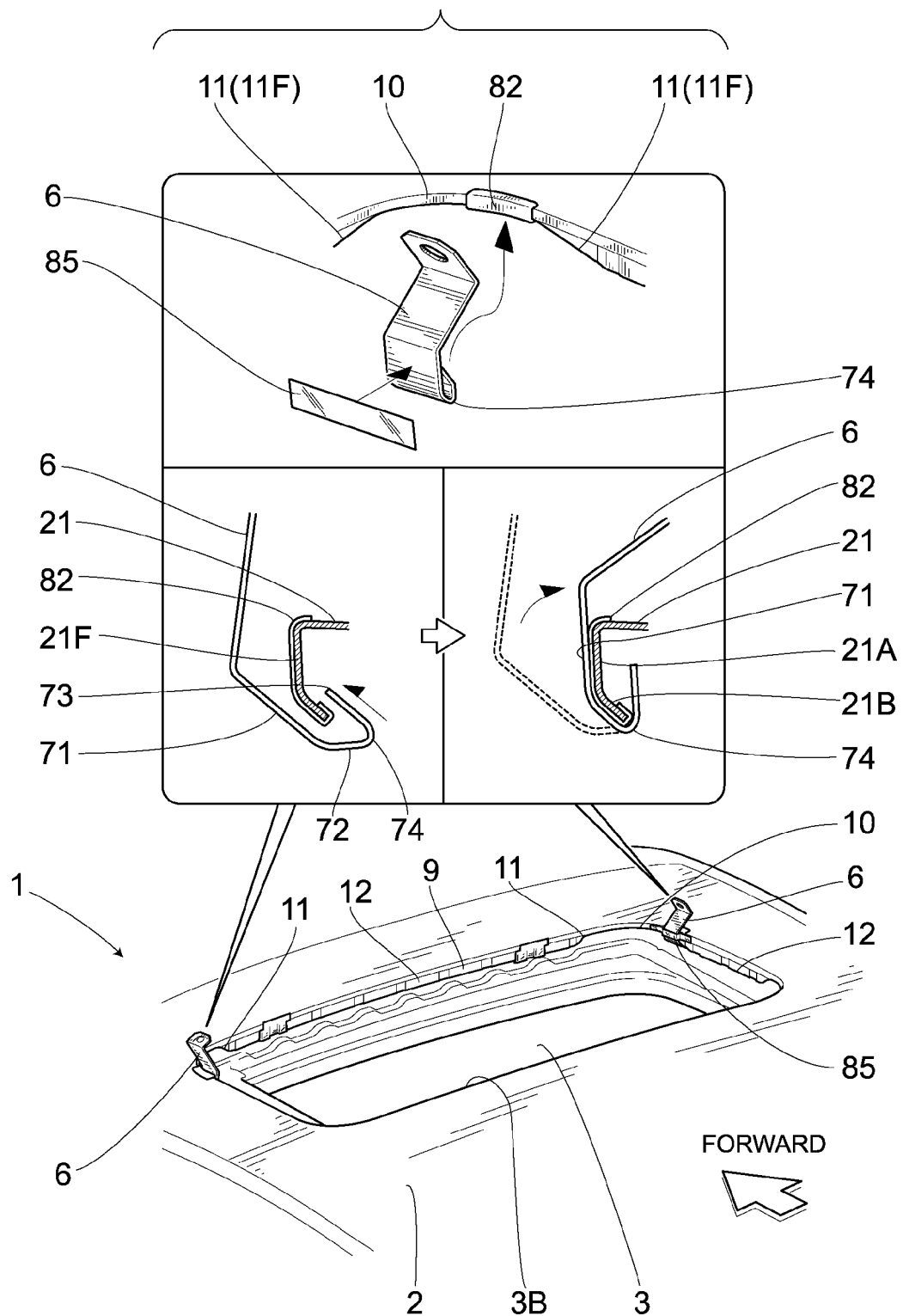

As shown in FIG. 10, for example, the aforementioned corner edge sections 10 are provided on a left and right corners that are located on the forward side of the opening section 3. Further, as shown in FIG. 12, for example, the opening flange portion 21F of the roof panel 21 at each corner edge section 10 includes the upper section 21A and the slanted section 21B. The lower end of this slanted section 21B is a free end, i.e., the aforementioned lower section 21C is not provided therebelow. There, the opening flange portion 22F is arranged in a location that is outside the opening section 3 and away from the opening flange portion 21F.

As shown in FIG. 17, for example, one of the aforementioned slanted edge sections 11 is formed between one of the corner edge sections 10 and the vertically elongated edge section 12 provided on the forward side of the edge portion 9. Here, this slanted edge section 11 is so slanted that a lower end 11F thereof extends downward from the corresponding corner edge section 10 toward the corresponding vertically elongated edge section 12. The lower end 11F of this slanted edge section 11 forms an angle of not larger than 45 degrees with the boundary 21S that is a bended line between the upper surface of the roof panel 21 and the upper section 21A. Further, the slanted edge sections 11 also serve as vertically short edge sections whose heights are smaller than those of the vertically elongated edge sections 12. Furthermore, as shown in FIG. 10, for example, the vertically elongated edge sections 12 are also provided on the left and right sides of the opening section 3. There, one of the slanted edge sections 11 is also provided between one of the corner edge sections 10 and the right or left vertically elongated edge section 12.

As shown in FIG. 1, FIG. 2 and FIG. 7, the aforementioned sunroof visor 4 includes a visor main body 23 made of a synthetic resin or the like. A molding attachment portion 24 is substantially provided on an entire lower edge of the visor main body 23 in a forward-rearward and the left-right directions. The molding attachment portion 24 includes an attachment groove 26 that is formed between an outer edge portion 25A and an inner edge portion 25B and serves as an attachment section. Here, a molding 27 to be attached to the molding attachment portion 24 is made of, for example, a synthetic rubber or a thermoplastic elastomer (TPV). The molding 27 integrally includes: a lower surface portion 27K capable of abutting against the upper surface of the roof portion 2; a press-fit protrusion 28 to be press-fitted into the attachment groove 26; an outer and inner covering portions 29A, 29B that are respectively disposed on a forward side and a rearward side of the press-fit protrusion 28; and an cover portion 30 that protrudes outward and whose front end is to be pressed against the upper surface of the roof portion 2. Particularly, while the outer covering portion 29A serves to cover an outer surface of the aforementioned outer edge portion 25A, the inner covering portion 29B serves to cover an outer surface of the aforementioned inner edge portion 25B. Further, the cover portion 30 is formed thinner toward the front end thereof, and protrudes outward at an initial position where the cover portion 30 actually points obliquely downward. However, in a vehicle-mounted state shown in FIG. 1, the cover portion 30 is elastically deformed upward as compared to the initial position thereof. There, an elastic restoring force resulting from such elastic deformation, causes the cover portion 30 to press against the upper surface of the roof portion 2, thus maintaining a water tightness therebetween.

The aforementioned visor main body 23 covers at least an upper region of a forward edge section of the opening section 3, and includes a center slanted portion 31 slanting slightly upward from a forward side to a rearward side thereof. Further, a forward slanted portion 32 is formed on the forward side of the center slanted portion 31, and a left and right slanted portions 33, 33 are respectively formed on a left side and a right side of the center slanted portion 31. Particularly, the forward slanted portion 32 and the left and right slanted portions 33, 33, are formed steeper than the center slanted portion 31. As shown in FIG. 7, for example, provided on a rearward edge of the visor main body 23 is a down-pointing rearward edge section 34. Here, a distance H between the down-pointing rearward edge section 34 and an upper surface of the sunroof 3S that is in a closed state, is not larger than 50 mm. Specifically, the distance H is a perpendicular distance between the down-pointing rearward edge section 34 and the upper surface of the sunroof 3S. More specifically, a lower end of the down-pointing rearward edge section 34 is formed into a curved shape, e.g. a hemispherical shape in the present embodiment.

A sunroof main body 41 of the sunroof 3S is made of a transparent panel such as that of a synthetic resin or glass. An attachment portion 42 made of a synthetic resin or the like is provided on a forward edge of the sunroof main body 41. Here, a weather strip 43 is installed in the attachment portion 42 as follows. That is, a protruding strip 45 of the weather strip 43 is fitted in an attachment groove 44 of the attachment portion 42 through dovetail joining. There, when the sunroof 3S is in the closed state, the weather strip 43 presses against an inner surface of the upper section 21A of the edge portion 9, thus ensuring a water tightness of the opening section 3. In FIG. 1, the weather strip 43 illustrated by a dashed-dotted line exhibits a shape prior to undergoing an elastic deformation. Particularly, the weather strip 43 undergoes an elastic deformation when abutting against the upper section 21A and the brackets 5.

Figure 4:
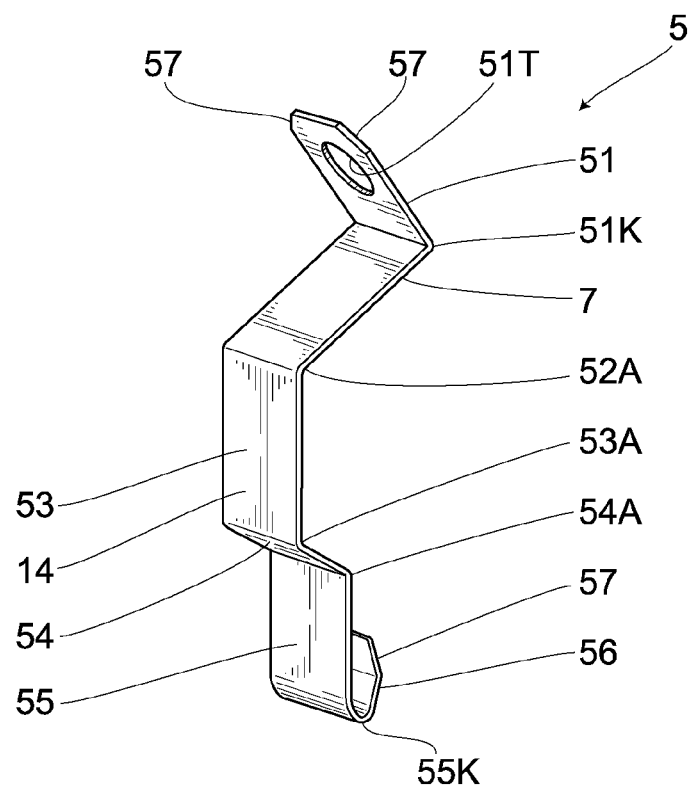
FIG. 4 is a perspective view showing a bracket that is to be disposed in a forward direction in the aforementioned mounting structure.

As shown in FIG. 4 and FIG. 5, each bracket 5 used to fix a forward portion of the sunroof visor 4, includes a visor attachment portion 51 that is formed on an upper section of the bracket 5 and conforms with an inner surface of the forward slanted portion 32. A lower end of such visor attachment portion 51 is provided with a bended portion 51K of an angle of approximately 90 degrees. Extended downward from such bended portion 51K is an upper extended portion 52 slanting inward. A bended portion 52K is further formed on a lower end of such upper extended portion 52. Extended downward from such bended portion 52K is a vertical fitting portion 53 whose lower end is further provided with a bended portion 53K. Here, extended downward from such bended portion 53K is a lower extended portion 54 slanting outward. A lower end of such lower extended portion 54 is provided with a bended portion 54K from which a vertical lower portion 55 is extended downward. Moreover, provided on a lower end of such lower portion 55 is a bended portion 55K formed by curving the lower end of the lower portion 55 outward and upward. Finally, extended upward from such bended portion 55K is a folded-back portion 56 slanting outward. Particularly, an angle of the lower extended portion 54 is substantially identical to that of the slanted section 21B. More particularly, each of an angle of the upper extended portion 52 and the angle of the lower extended portion 54 is formed not smaller than 30 degrees and not larger than 45 degrees to the horizontal.

In fact, the aforementioned engagement portion 8 is composed of the folded-back portion 56 and the lower portion 55. Further, a chamfered section 57 of an angle of 45 degrees is formed on an upper left and right corners of both the visor attachment portion 51 and the folded-back portion 56. Furthermore, as shown in FIG. 1, a clearance 58 is formed between the folded-back portion 56 and an outer surface of the lower edge 13 with the engagement portion 8 being engaged with the lower edge 13.

Figures 5A, 5B:
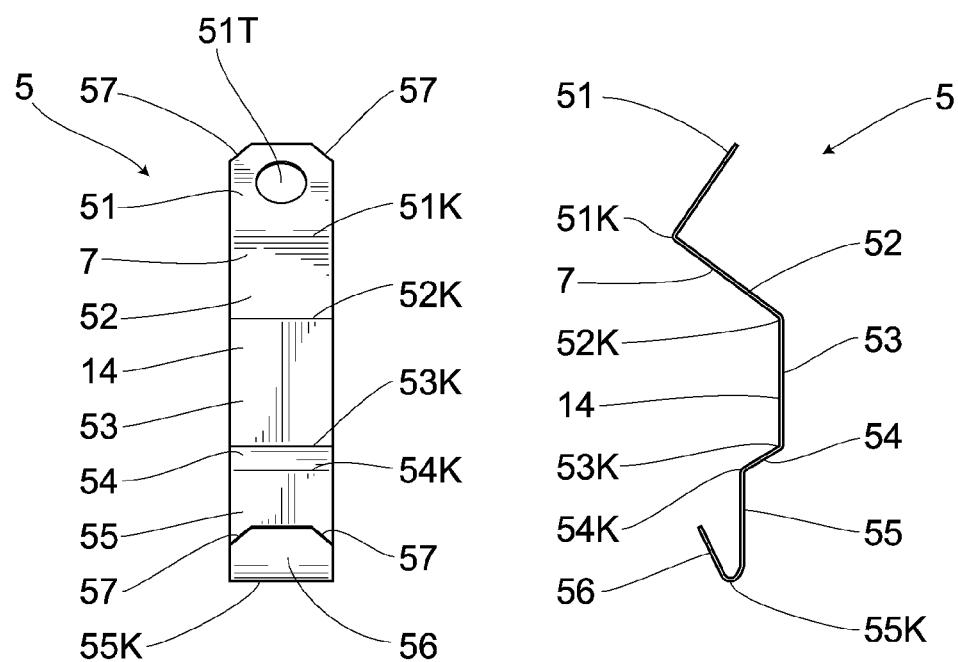
FIG. 5A is a rear view of the bracket that is to be disposed in the aforementioned forward direction.
FIG. 5B is a side view of the bracket that is to be disposed in the aforementioned forward direction.
Figure 8:
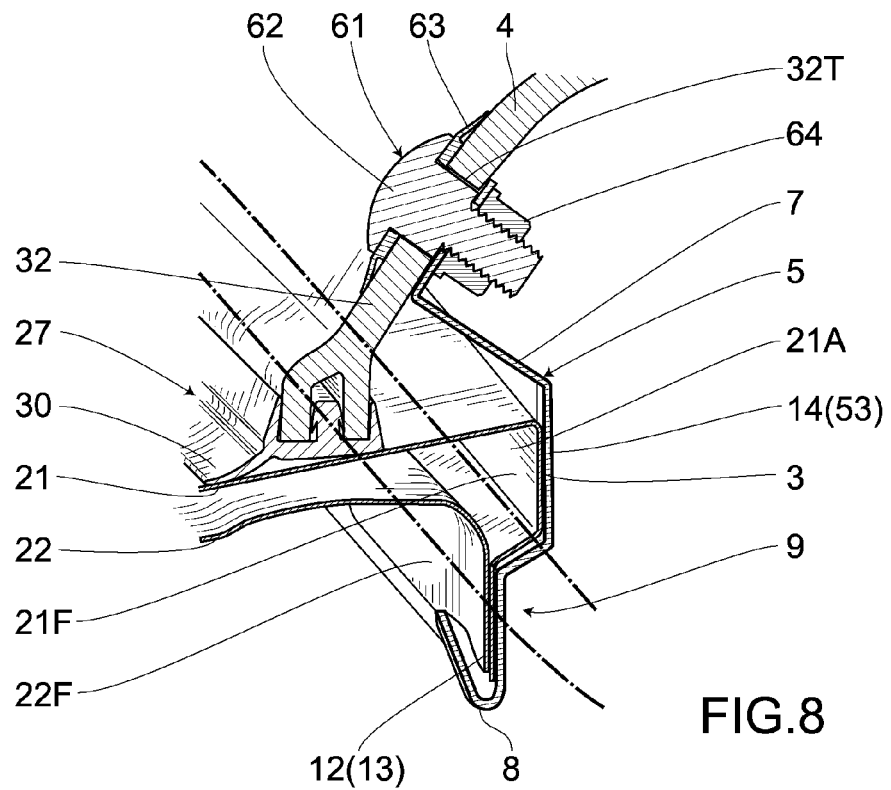
FIG. 8 is a cutaway explanatory perspective view showing a mounting structure of a forward portion of the sunroof visor in the first embodiment.
Figure 9:
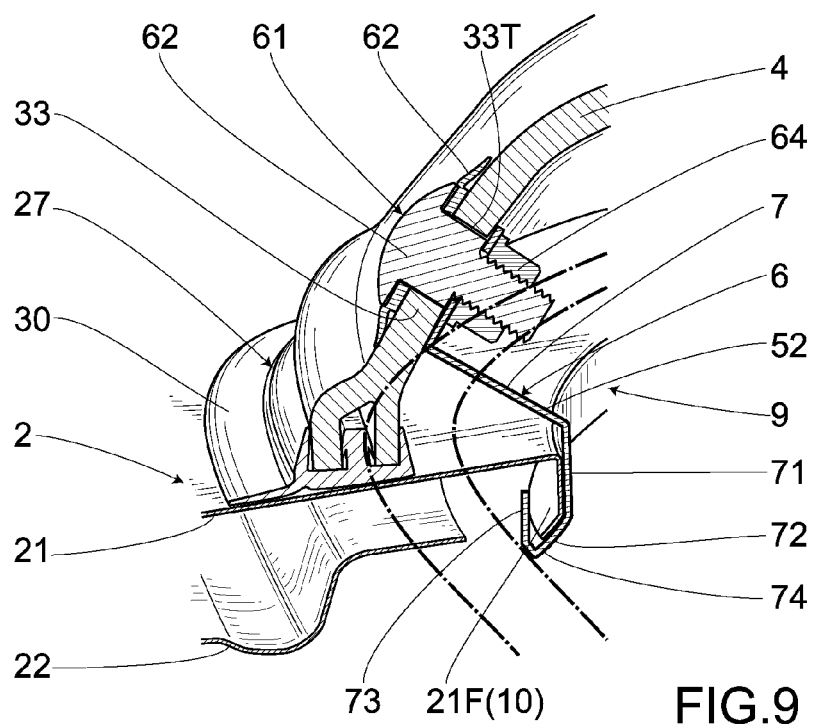
FIG. 9 is a cutaway explanatory perspective view showing a mounting structure of a lateral portion of the sunroof visor in the first embodiment.

In fact, the aforementioned extended supporting portion 7 is composed of the visor attachment portion 51 and the upper extended portion 52. Further, the aforementioned intermediate portion 14 is in fact composed of the upper extended portion 52, the fitting portion 53 and the lower extended portion 54. As shown in FIG. 1 and FIG. 5B, the intermediate portion 14 is substantially formed into the toppled "U" shape that substantially conforms with the shapes of the slanted section 21B and upper section 21A, and with a shape of a portion of the roof panel 21 that is located on the forward side of the upper section 21A of the opening section 3. As mentioned above, while the upper extended portion 52 slants upward and forward, the lower extended portion 54 slants downward and forward.

Here, a through hole 51T serving as a bracket through hole is bored in the visor attachment portion 51. Moreover, bored in the aforementioned forward slanted portion 32 are a plurality of through holes 32T serving as visor through holes, each through hole 32T corresponding to the through hole 51T.

Figure 14:
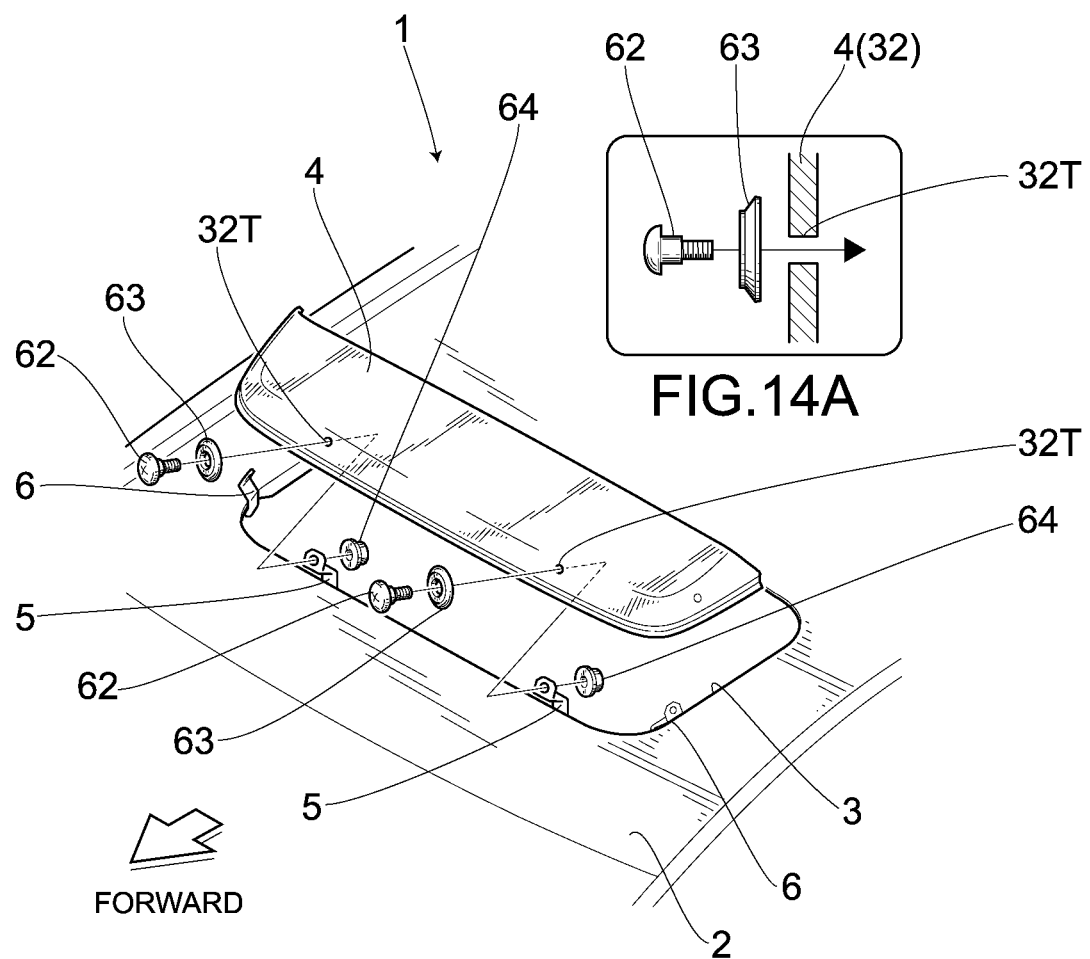

As shown in FIG. 2 and FIG. 14, the through holes 32T are also bored in a left and right sides of the visor main body 23 in the present embodiment.

A fixation unit 61 for fixing the forward slanted portion 32 to the visor attachment portion 51, includes a shoulder screw 62 that serves as a screw member and is to be inserted through each through hole 32T and the through hole 51T. Particularly, the shoulder screw 62 includes: a head portion 62H having a large diameter; a large-diameter portion 62K provided on the head portion 62H; and a male screw portion 62N that is integrally provided on a front end of the large-diameter portion 62K and has a diameter smaller than that of the large-diameter portion 62K. More particularly, a step portion 62D is provided between the large-diameter portion 62K and the male screw portion 62N, and a spring washer 63 is provided between an outer surface of the forward slanted portion 32 and the head portion 62H. Here, the large-diameter portion 62K is to be inserted through the spring washer 63 such that the step portion 62D can be located inside each through hole 32T and in the vicinity of the inner surface of the forward slanted portion 32. Further, the male screw portion 62N is to be inserted through the through hole 51T while bringing the visor attachment portion 51 into contact with the inner surface of the forward slanted portion 32. A flange nut 64 is then screwed to the male screw portion 62N thus inserted through the through hole 51T. In this way, the forward slanted portion 32 can be fixed to the visor attachment portion 51 through the flange nut 64 and the shoulder screw 62.

The aforementioned left and right brackets 6 are to be engaged with portions of the left and right corner edge sections 10 that are located toward a rearward side of the vehicle. As shown in FIG. 6, each bracket 6 includes the visor attachment portion 51 and the upper extended portion 52. A small fitting portion 71 whose height is smaller than that of the fitting portion 53, is provided on a lower end of such upper extended portion 52 through the bended portion 52K. A bended portion 71K is provided on a lower end of such small fitting portion 71. Extended downward from the bended portion 71K is a lower-end slanted portion 72 slanting outward. Here, provided on a lower end of such lower-end slanted portion 72 is a bended portion 72K formed by curving the lower end of the lower-end slanted portion 72. Moreover, a folded-back portion 73 is extended outward and then upward from the bended portion 72K. Particularly, the folded-back portion 73 is substantially parallel to the aforementioned fitting portion 53.

In fact, the lower-end slanted portion 72 and the folded-back portion 73 compose an engagement portion 74 that is engageable with a lower end of each corner edge section 10. Further, the chamfered section 57 of the angle of 45 degrees is formed on the upper left and right corners of the visor attachment portion 51, and on an upper left and right corners of the folded-back portion 73.

Furthermore, through holes 33T corresponding to the through holes 51T of the brackets 6, are bored in forward sides of both the left and right slanted portions 33, 33.

Described hereunder is a method for mounting the sunroof visor 4. As shown in FIG. 10, a mark 81 is to be left on a rearward side of each corner edge section 10 with a writing tool such as a felt pen. This mark 81 corresponds to a location where one of the brackets 6 is to be attached, and is actually to be left on a boundary between one of the corner edge sections 10 and one of the slanted edge sections 11. Further, a protection tape 82 serving as a protection material is to be attached to this corner edge section 10 along the mark 81. Particularly, a left/right width of the protection tape 82 is formed wider than that of each bracket 6. That is, the protection tape 82 is so attached to this corner edge section 10 that it ranges from the upper surface of the roof portion 2 that is above the upper section 21A to an outer surface of the slanted section 21B.

As shown in FIG. 11, for example, concave portions 83 are formed on the lower edge 13 of the vertically elongated edge section 12 that is located on the forward side of the opening section 3. Particularly, the concave portions 83 are concaved outward, and are provided at intervals in the left-right direction. Further, a protection tape 84 serving as a protection material is to be attached to this vertically elongated edge section 12 where the concave portions 83 are located away from the corner edge sections 10 by given distances. Particularly, a left/right width of this protection tape 84 is formed wider than that of each bracket 5. That is, the protection tape 84 is so attached that it ranges from an upper end of the upper section 21A to an inner surface of the lower edge 13. Here, it is preferred that an upper end of the protection tape 84 be arranged in a same plane as the upper surface of the roof portion 2 or therebelow such that an impact of rain or the like becomes less significant. The protection tape 84 is also to be attached to the outer surface of the lower edge 13 as a result of folding back the corresponding protection tape 84 at a lower end of the lower edge 13. While the aforementioned protection tape 82 is formed into a substantially rectangular shape that is long in a horizontal direction, the protection tape 84 is formed into a substantially rectangular shape that is long in a vertical direction.

After attaching the protection tapes 82, 84 to the locations where the brackets 5, 6 are to be attached, the left and right brackets 6 are then attached to the corner edge sections 10 as follows. That is, as shown in FIG. 12, the engagement portion 74 is to be engaged from underneath with the lower end of one of the corner edge sections 10, with an upper portion of each bracket 6 being tilted inward. The small fitting portion 71 and the lower-end slanted portion 72 are then brought into contact with the protection tape 82 attached to an inner surface of the corresponding corner edge section 10, followed by attaching a lower portion of this bracket 6 to such corner edge section 10 through an adhesive tape 85.

Figure 13:
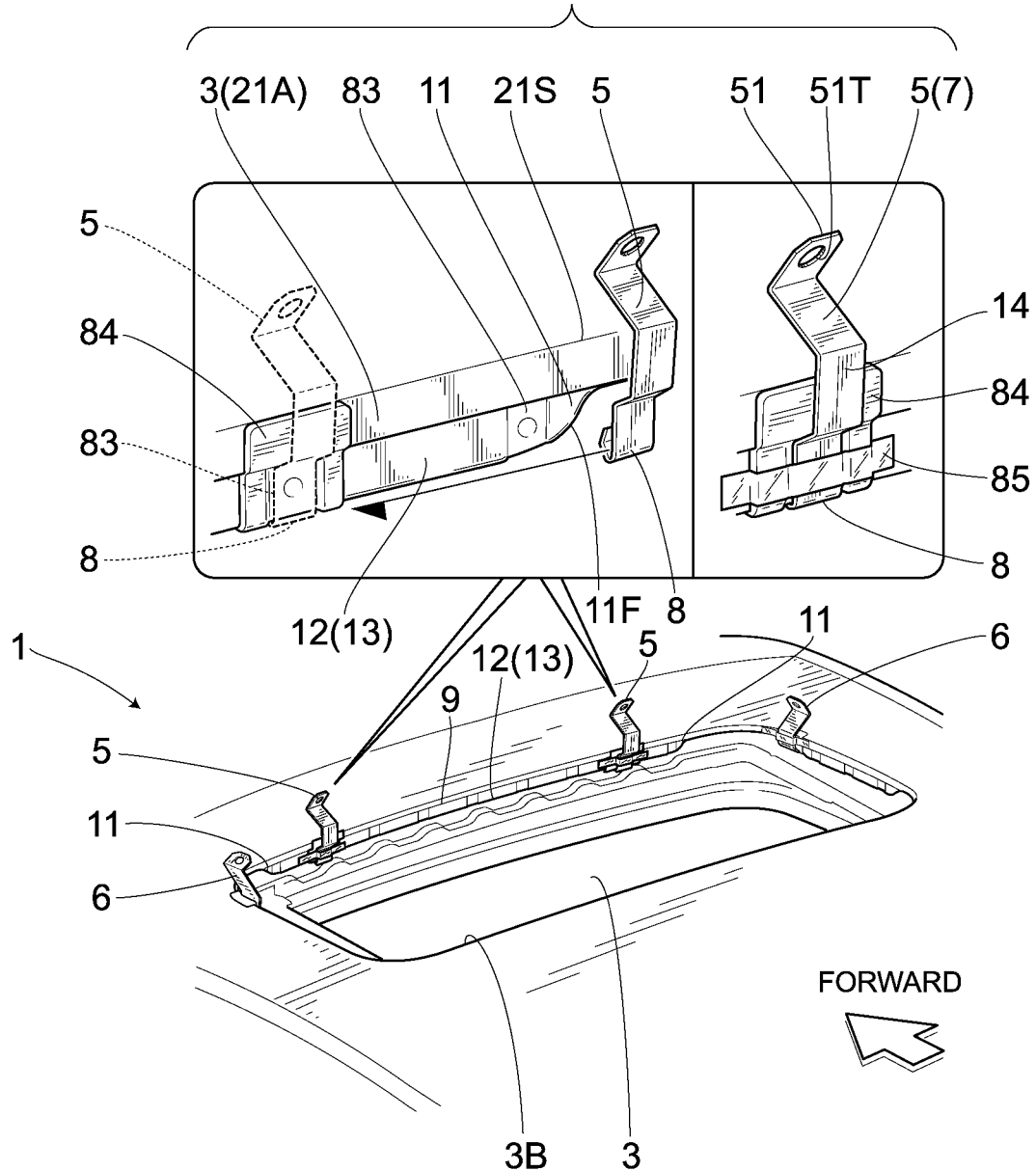

Described hereunder is a method for attaching the brackets 5 in the forward direction, which is one of the features of the present invention. As shown in FIG. 13 and FIG. 17, each bracket 5 is at first positioned to one of the corner edge sections 10 serving as initial locations. At that time, the fitting portion 53 is brought so close to the upper section 21A of the opening section 3 that a clearance is to be formed therebetween and that the intermediate portion 14 is allowed to surround the upper section 21A under such condition. The bracket 5 thus positioned is then horizontally moved toward the aforementioned vertically elongated edge section 12 serving as an attachment location. Here, at a vertically elongated edge section 12 side of one of the slanted edge sections 11, the lower end 11F is to be sandwiched by the engagement portion 8, followed by further moving the bracket 5 in the horizontal direction with the bended portion 52K being positioned higher than the upper surface of the roof portion 2. At the attachment location, the engagement portion 8 is further engaged with the lower edge 13 of the vertically elongated edge section 12, followed by attaching the engagement portion 8 to the lower edge 13 through the adhesive tape 85. Here, the adhesive tape 85 is so attached to the lower edge 13 that it bidirectionally extends beyond the protection tape 84. Further, the aforementioned slanted edge section 11 may also be used as the initial location for attaching each bracket 5.

As mentioned above, each bracket 5 is to be engaged with the aforementioned vertically elongated edge section 12 after being slid horizontally from either one of the corner edge sections 10 serving as vertically short edge sections or one of the slanted edge sections 11, thereby making it possible to effortlessly attach such bracket 5 even if the intermediate portion 14 is substantially formed into the toppled "U" shape.

Figure 15:
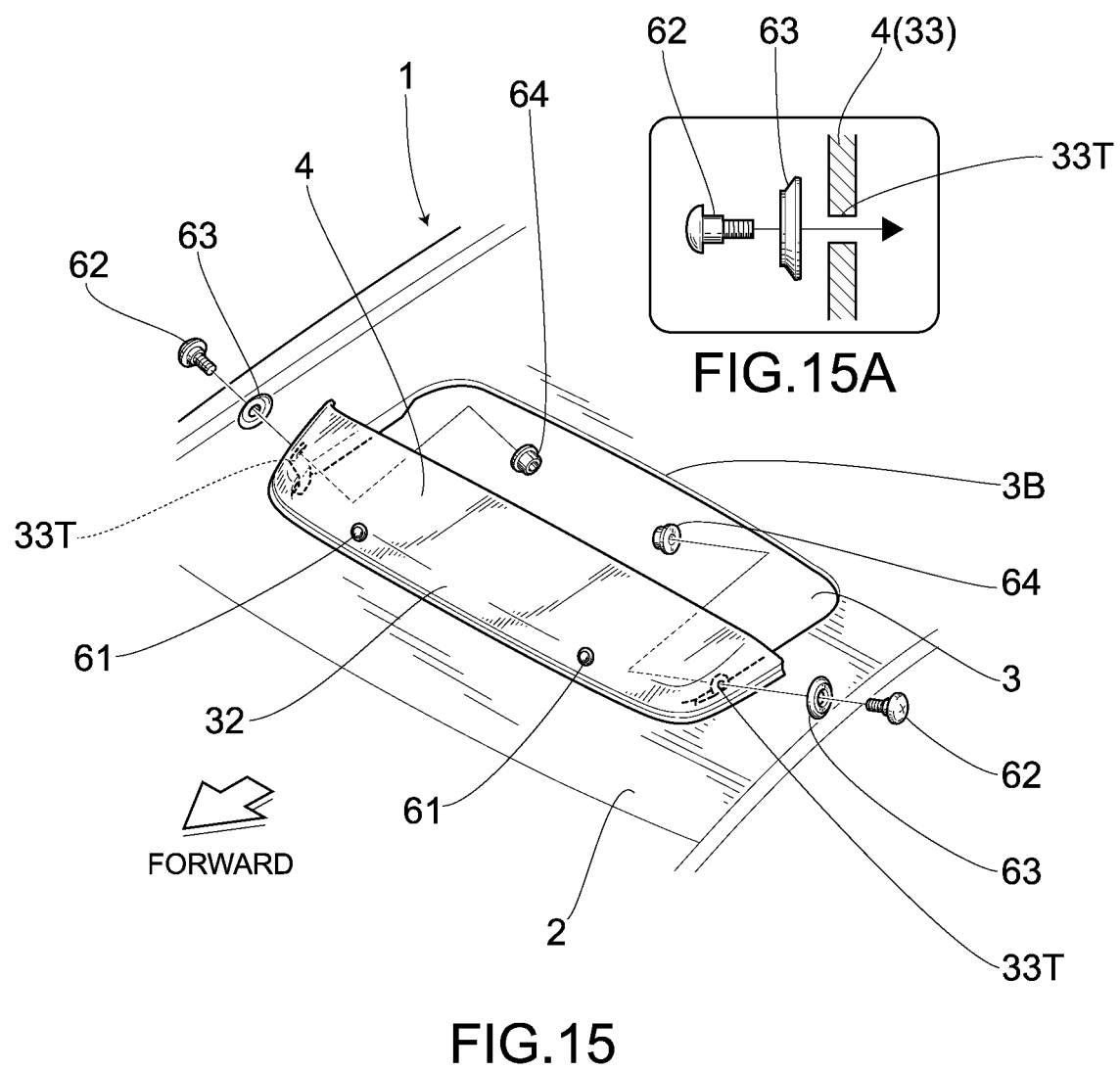
Figure 16:
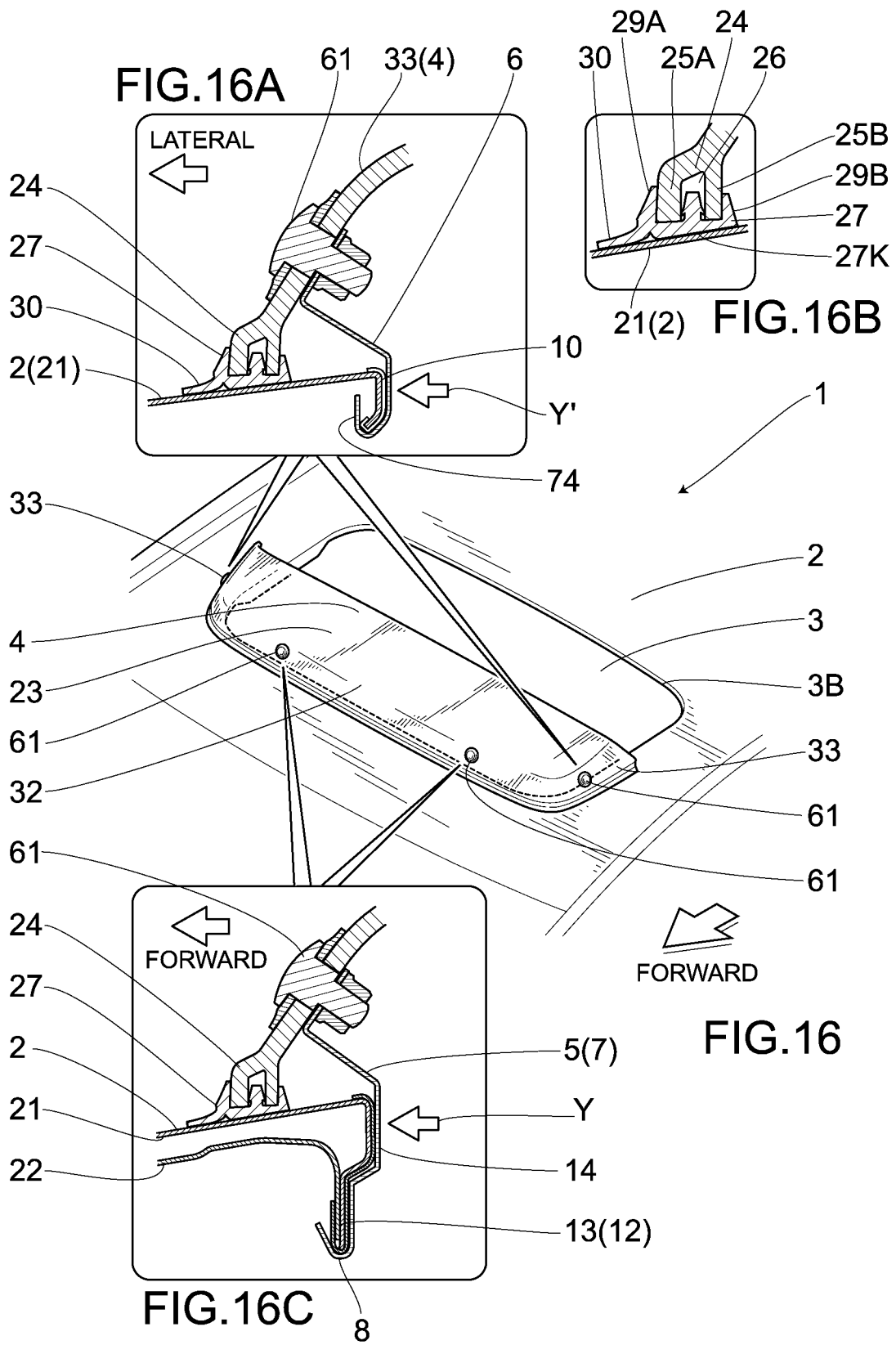

After attaching the brackets 5, 6, the sunroof visor 4 is to be disposed on the roof portion 2, as shown in FIG. 14 and FIG. 15. There, the brackets 5, 5 are to be fixed to the forward slanted portion 32 through the fixation units 61, 61, followed by fixing the brackets 6, 6 to the left and right slanted portions 33, 33 also through the fixation units 61, 61. Further, as shown in FIG. 16, on the forward side of the roof portion 2, after attaching the fixation units 61, the brackets 5 are to be pushed in a forward direction shown by an arrow Y, and the brackets 6, 6 are to be pushed outward in a left-right direction shown by an arrow Y', thereby allowing a position of the molding 27 to the roof portion 2 to be confirmed. There, the left and right slanted portions 33, 33 are to be arranged symmetrical to each other, and it is to be confirmed whether or not the molding 27 is twisted. If the molding 27 is found to be twisted, for example, the shoulder screw 62 can then be loosened to adjust the corresponding molding 27 and a mounting position of the sunroof visor 4.

The present embodiment is related to claim 1. As mentioned above, the vehicular sunroof visor 4 is to be disposed on the forward side of the opening section 3. Particularly, the vehicular sunroof visor 4 is to be installed in the vehicle 1 including: the corresponding opening section 3 formed on the roof portion 2; and the sunroof 3S capable of freely opening the opening section 3. Further, provided on the opening section 3 is the edge portion 9 extending downward. This edge portion 9 is formed into thin thin-walled structure and includes: the corner edge sections 10 serving as vertically short edge sections; the slanted edge sections 11; and the vertically elongated edge sections 12, the corner edge, slanted edge and vertically elongated edge sections 10, 11 and 12 being arranged in the vertical direction. The sunroof visor 4 is to be fixed to the opening section 3 through the brackets 5. Each bracket 5 includes: the extended supporting portion 7 that is extended forward from the opening section 3 and is used to fix the sunroof visor 4; and the engagement portion 8 that is engageable with the aforementioned vertically elongated edge section 12 after being moved from one of the corner edge sections 10 or one of the slanted edge sections 11 to the corresponding vertically elongated edge section 12 for coupling the sunroof visor 4. Accordingly, the brackets 5 for attaching the sunroof visor 4, can engage with the opening section 3 of the vehicle 1 at a lower position, thereby making it possible to lower the mounting position of the sunroof visor 4 itself, thus not only improving an exterior appearance, but also reducing an air resistance such that a mounting rigidity can be improved as well.

Further, the present embodiment is also related to claim 2. As mentioned above, the lower edge 13 of the aforementioned vertically elongated edge section 12 allows the engagement portion 8 to engage therewith. Particularly, such lower edge 13 is formed forward and away from the upper section 21A serving as the inner surface of the opening section 3. Here, each bracket 5 also includes: the fitting portion 53 that is formed below the extended supporting portion 7 and substantially conforms with the upper section 21A; and the lower extended portion 54 that is formed between such fitting portion 53 and the engagement portion 8. That is, as for each bracket 5, the upper extended portion 52 of the extended supporting portion 7, the fitting portion 53 and the lower extended portion 54 are substantially formed into the toppled "U" shape as a whole. Such bracket 5 is to be disposed along the opening section 3, thereby improving a degree of freedom for adjusting the mounting position of the sunroof visor 4 in the forward-rearward direction.

Effects of the present embodiment are described hereunder. Particularly, each bracket 5 is to be fixed to the sunroof visor 4 as follows. That is, the engagement portion 8 is to be inserted from: one of the corner edge sections 10 serving as vertically short edge sections; and/or one of the slanted edge sections 11. There, the engagement portion 8 is to be engaged with the lower end of either such corner edge section 10 or such slanted edge section 11, followed by moving the corresponding bracket 5 to the aforementioned vertically elongated edge section 12 for coupling the sunroof visor 4 such that the extended supporting portion 7 can be fixed to the sunroof visor 4. Therefore, as compared to a conventional method where fixation is performed through upward lifting, the present embodiment allows the height of the fitting portion 53 to be controlled, and the extended supporting portion 7 to protrude forward to a large extent. Further, since the slanted edge sections 11 are provided on end regions of the corner edge sections 10, the folded-back portion 56 of the engagement portion 8 can smoothly engage with the outer surface of the lower edge 13 after being guided by one of the slanted edge sections 11.

Further, since the chamfered section 57 of the angle of 45 degrees is provided on the upper left and right corners of the folded-back portion 56, the corresponding corners shall not come into contact with the opening section 3 when moving each bracket 5 in the horizontal direction. Furthermore, since the engagement portion 8 of such bracket 5 is to be engaged with the lower edge 13, and since the lower extended portion 54 is configured to abut against the slanted section 21B through the protection tape 84, there can be achieved a mounting structure that is strongly resistant to upward forces. Furthermore, since the protection tapes 82, 84 are elastic, the brackets 5, 6 can stably engage with the opening section 3. Meanwhile, the through holes 32T for fixing the brackets 5 are to be positioned in a forward area of the vehicle that is away from the upper section 21A serving as an opening-section inner surface. And, the elastic molding 27 is so disposed between the upper surface of the roof portion 2 and the sunroof visor 4 that the molding 27 is actually sandwiched therebetween in a pressurized manner. For these reasons, the elastic restoring force of the molding 27 causes an upper portion of each bracket 5 to be subjected to an upward force (an upward force applied diagonally) that is generated on the forward side of the opening section 3. Thus, not only the engagement portion 8 can further reliably engage with the lower edge 13, but the brackets 5 can tightly abut against the opening flange portion 21F. Moreover, when the engagement portion 8 is loosely engaged with the lower edge 13, there is formed the clearance 58 due to the fact that a distance between an upper end of the folded-back portion 56 and the lower extended portion 54 is larger than a thickness of the lower edge 13. For this reason, each bracket 5 can be moved in the horizontal direction with the engagement portion 8 thereof being engaged with the lower edge 13 and with the clearance being disposed between an inner surface of the opening flange portion 21F and such bracket 5. Thus, each bracket 5 can be prevented from sliding on the inner surface of the opening flange portion 21F, when being moved in the horizontal direction.

However, the present invention is not limited to the present embodiment. As a matter of fact, various modified embodiments are possible within the scope of the present invention. For example, although the aforementioned embodiment employs the brackets that are to be engaged with the vertically elongated edge section located on the forward side of the opening section, the left and right sides of the sunroof visor may be fixed by brackets that are to be engaged with the vertically elongated edge sections located on the left and right sides of the opening section.

What is claimed:

1. A mounting structure of vehicular sunroof visor, for use in a vehicle having an opening section formed on a roof portion and a sunroof capable of freely opening and closing said opening section, comprising:
    a vehicular sunroof visor disposed on a forward side of said opening section;
    an edge portion provided in said opening section, said edge portion extending downward and being composed of at least one vertically short edge section and at least one vertically elongated edge section; and
    at least one bracket for fixing said vehicular sunroof visor to said opening section, wherein
    said at least one bracket includes:
    an extended supporting portion provided with an upper extended portion that is extended forward from said opening section, said extended supporting portion being used to fix said vehicular sunroof visor; and
    an engagement portion engaged with said at least one vertically elongated edge section, said engagement portion formed by folding back forward and upward,
    wherein said at least one vertically elongated edge section includes a lower edge formed forward and away from an inner surface of said opening section,
    said at least one bracket further includes an intermediate portion composed of:
    said upper extended portion;
    a fitting portion formed below said extended supporting portion and substantially conforms with the inner surface of said opening section; and
    a lower extended portion formed between said fitting portion and said engagement portion,
    and wherein at least one slanted edge section is provided between said at least one vertically short edge section and said at least one vertically elongated edge section, said at least one slanted edge section slanting downward from said at least one vertically short edge section to said at least one vertically elongated edge section, while
    said upper extended portion slants upward and forward, and
    said lower extended portion slants downward and forward, wherein said engagement portion includes:
    a vertical lower portion provided on a lower end of a lower extended portion;
    a bended portion formed by curving a lower end of said lower portion outward and upward; and
    a folded-back portion slanting outward and upward from said bended portion,
    and wherein said bended portion of said at least one bracket is located in a position lower than that of a lower end of said at least one vertically elongated edge section provided on said opening section formed on said roof portion when said at least one bracket is attached onto said vehicle,
    an upper end of said folded-back portion of said at least one bracket is located in a position that is lower than that of a lower end of said at least one vertically short edge section provided on said opening section formed on said roof portion and is higher than that of the lower end of said at least one vertically elongated edge section when said at least one bracket is attached onto said vehicle, and thus
    said at least one bracket is configured to be engageable with said at least one vertically elongated edge section after being slid horizontally from said at least one vertically short edge section.

2. The mounting structure of vehicular sunroof visor according to claim 1, wherein at least one fixing location for fixing said extended supporting portion to said vehicular sunroof visor is set away from said opening section in a forward direction.

3. The mounting structure of vehicular sunroof visor according to claim 2, wherein said at least one fixing location corresponds to a bracket through hole bored in said extended supporting portion, and at least one visor through hole corresponding to said bracket through hole is bored in said vehicular sunroof visor, said extended supporting portion being fixed to said vehicular sunroof visor through a fixation unit that is inserted through said bracket through hole and said at least one visor through hole.

4. The mounting structure of vehicular sunroof visor according to claim 3, wherein said extended supporting portion includes a visor attachment portion that is formed on an upper section thereof and conforms with an inner surface of said vehicular sunroof visor, said visor attachment portion having said bracket through hole bored therein.

5. The mounting structure of vehicular sunroof visor according to claim 2, wherein an elastic molding is sandwiched between an upper surface of said roof portion and said vehicular sunroof visor in a pressurized manner.

6. The mounting structure of vehicular sunroof visor according to claim 1, wherein
    said folded-back portion has a chamfered section formed on upper left and right corners thereof.

* * * * *